Figure 1:
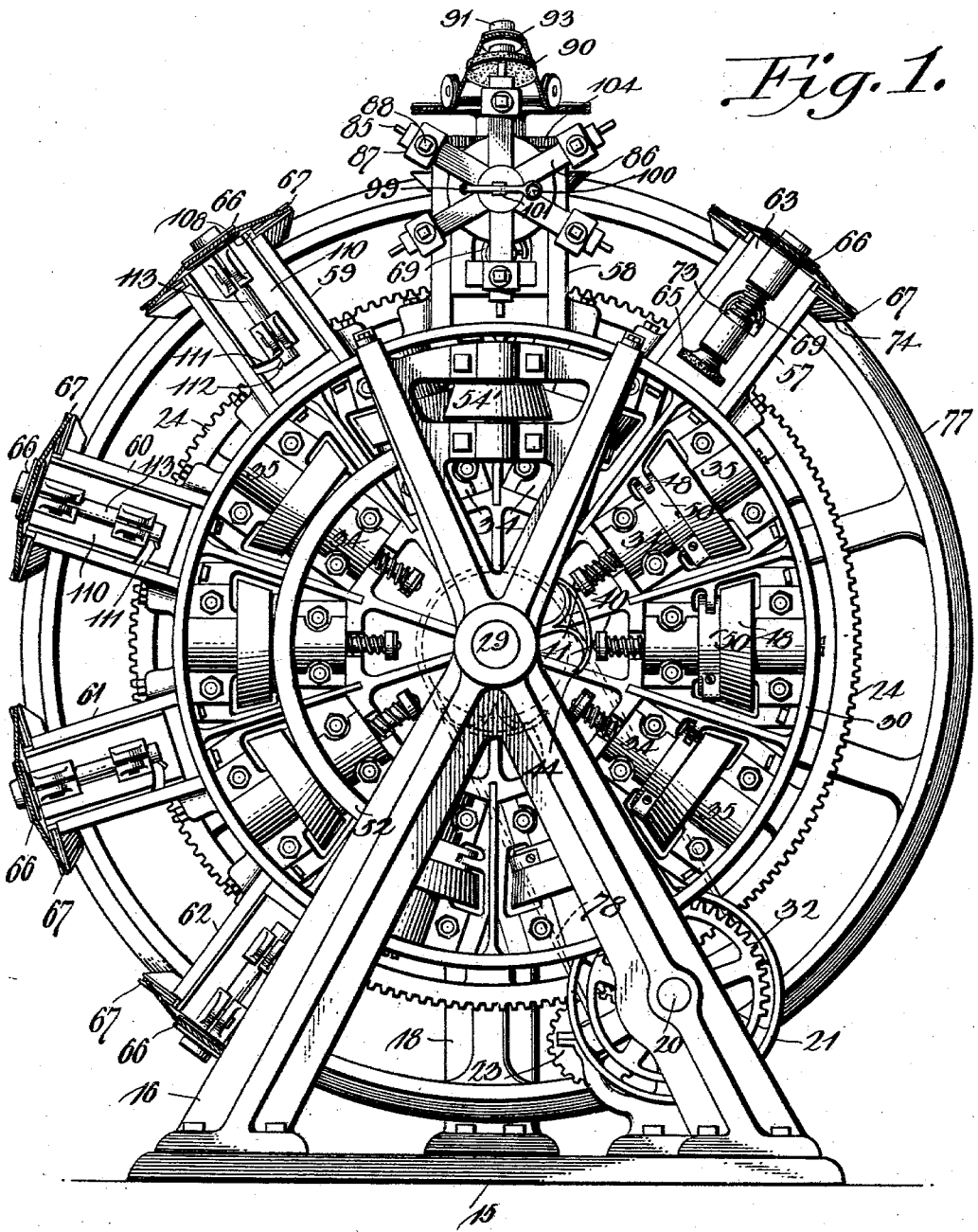

No. 740,991. PATENTED OCT. 6, 1903.
G. W. PELTON.
BUTTON MAKING MACHINE.
APPLICATION FILED AUG. 12, 1902.
NO MODEL. 5 SHEETS—SHEET 1.

Witnesses
G. W. Pelton, Inventor.
by C. A. Snow & Co.
Attorneys

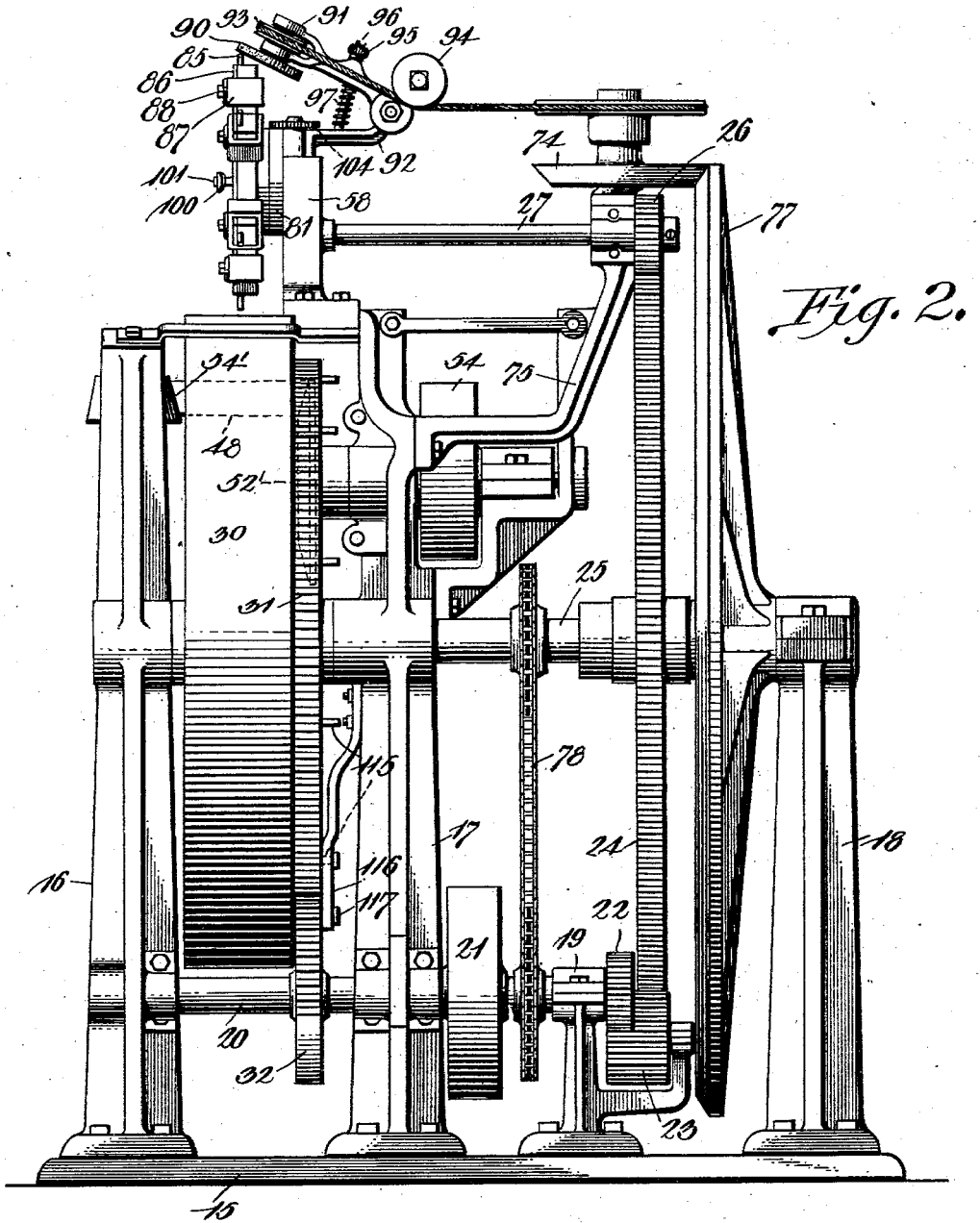

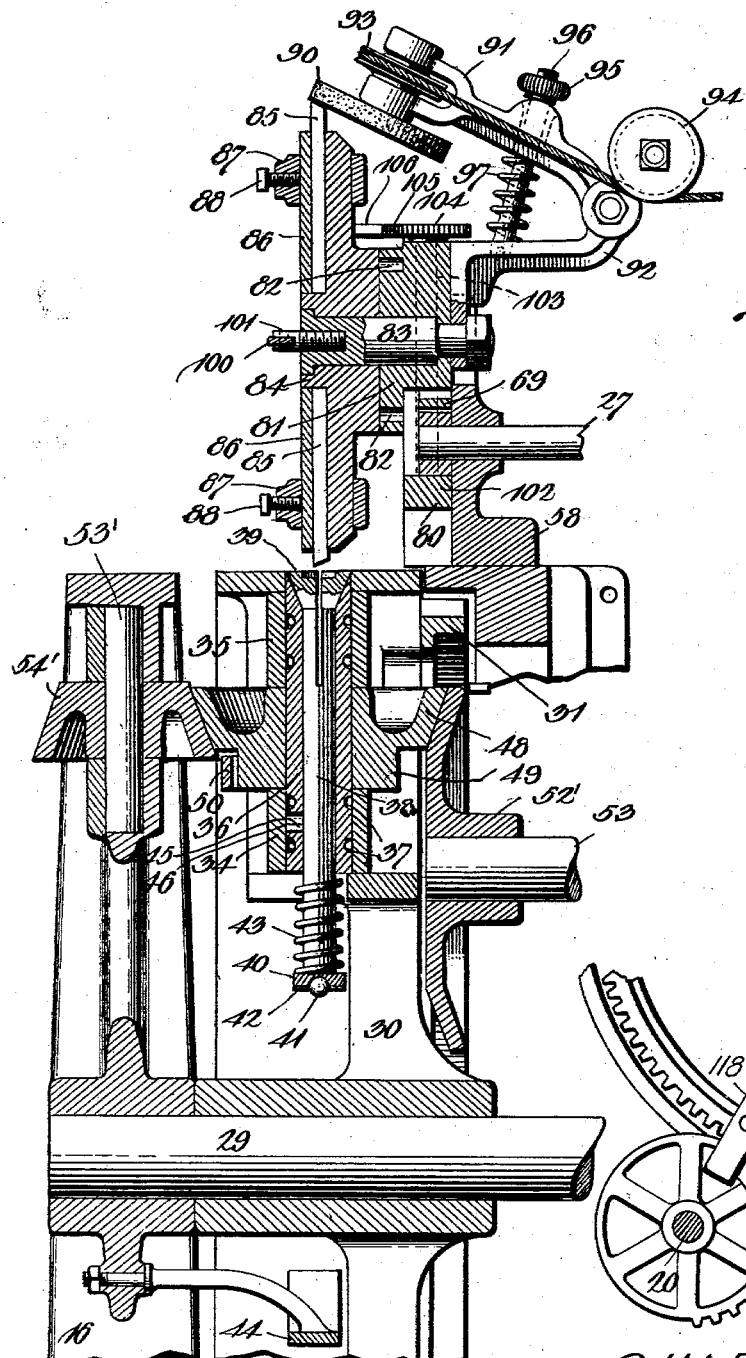

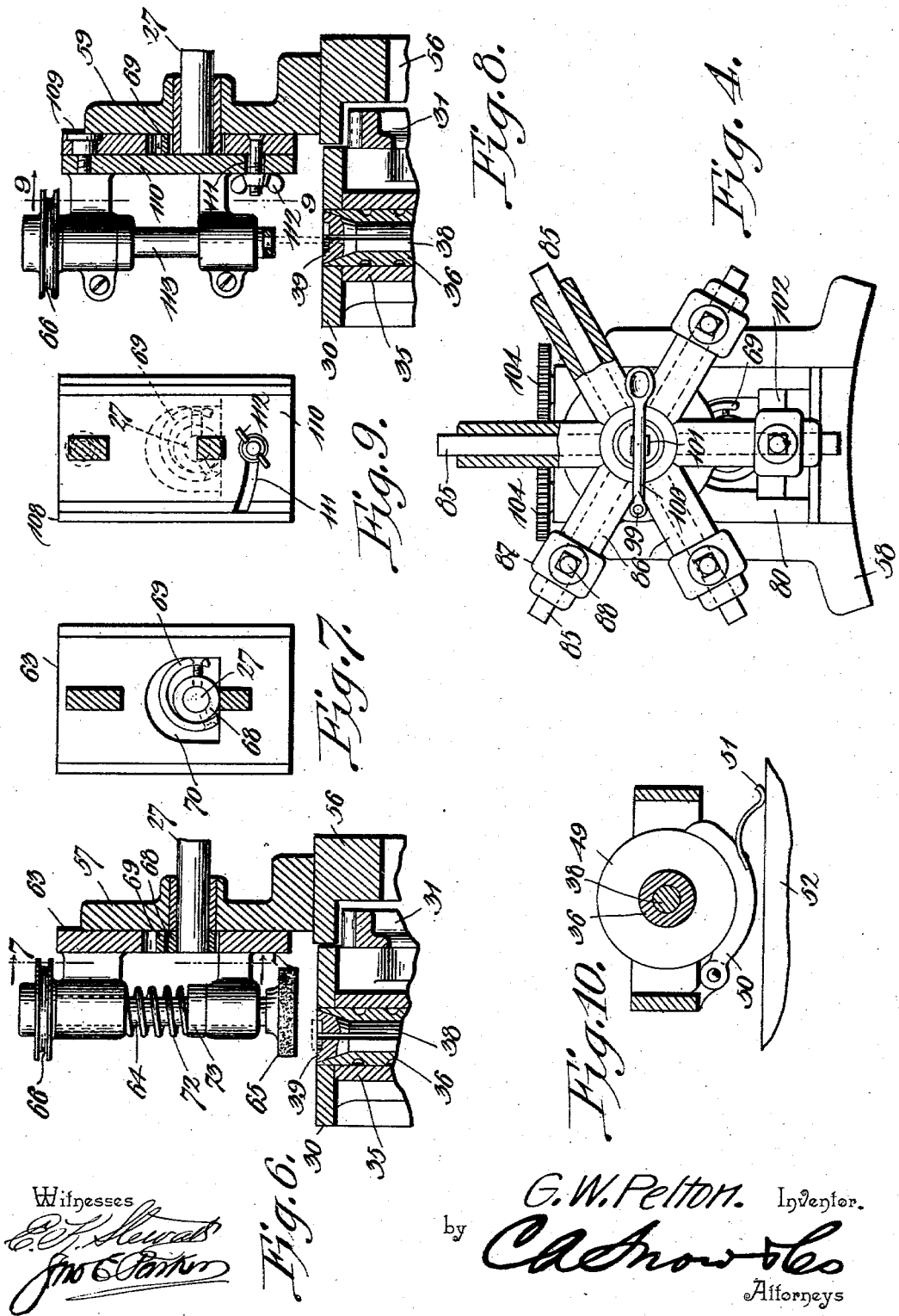

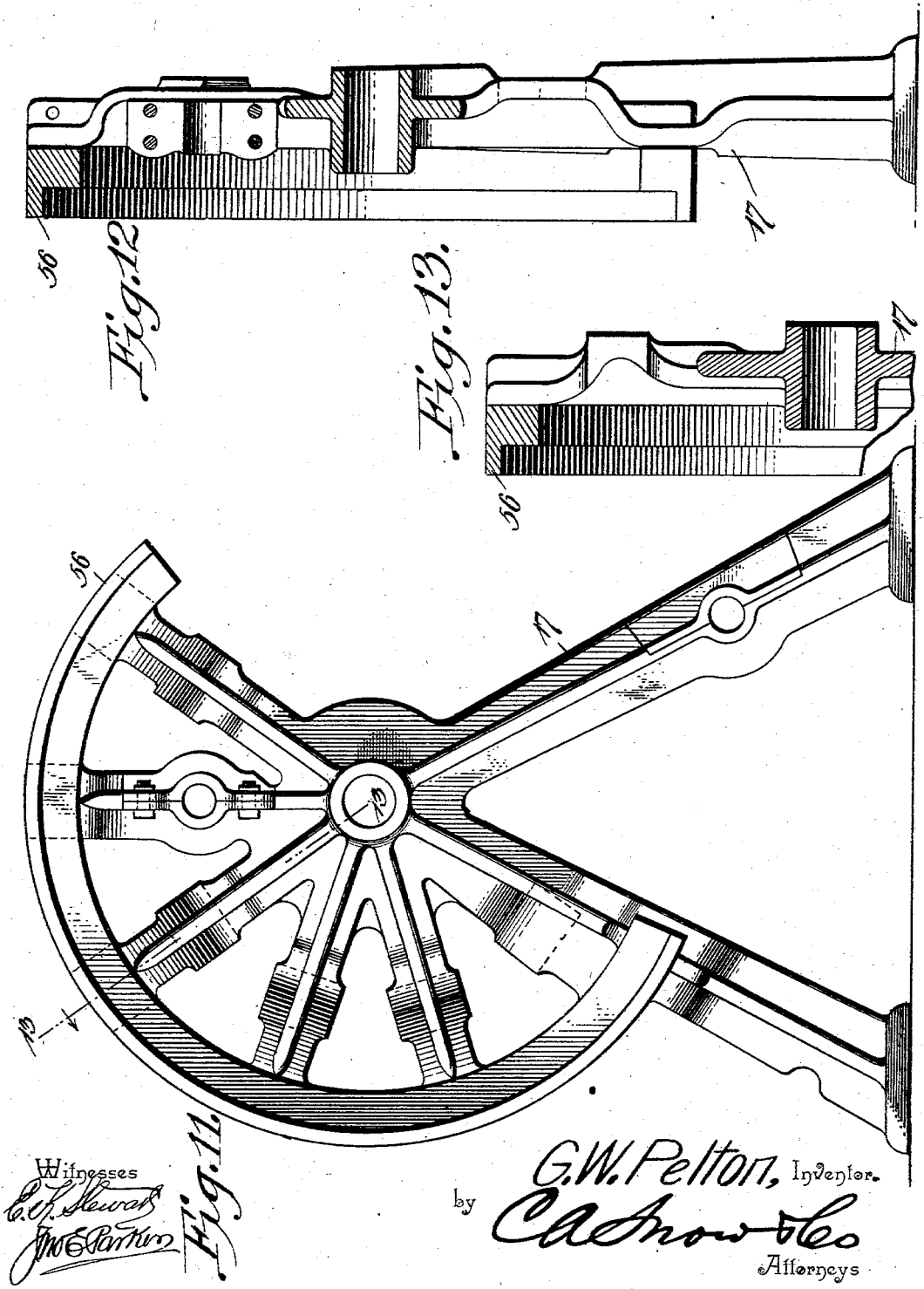

No. 740,991.

Patented October 6, 1903.

UNITED STATES PATENT OFFICE.

GEORGE W. PELTON, OF MUSCATINE, IOWA, ASSIGNOR TO BOEPPLE BUTTON COMPANY, OF MUSCATINE, IOWA.

BUTTON-MAKING MACHINE.

SPECIFICATION forming part of Letters Patent No. 740,991, dated October 6, 1903.

Application filed August 12, 1902. Serial No. 119,418. (No model.)

*To all whom it may concern:*

Be it known that I, GEORGE W. PELTON, a citizen of the United States, residing at Muscatine, in the county of Muscatine and State of Iowa, have invented a new and useful Button-Making Machine, of which the following is a specification.

The invention relates to certain improvements in machinery employed in the manufacture of buttons.

The principal object of the invention is to provide a machine which will finish, center, and drill any desired number of holes in a button, the various steps in the operation being carried on automatically and the machine being supplied with rough blanks and delivering finished buttons.

A further object of the invention is to provide an improved form of button-holding chuck and chuck-operating mechanism which will permit of the rapid rotation of the chuck and button during the operation of centering or forming the central depression or recess usually found in buttons and for maintaining the chuck and button in proper position during the drilling operation, the centered blank being presented successively to any desired number of drills and each drill forming a separate opening in the button.

A still further object of the invention is to provide for the reduction of the successive blanks to a substantially uniform thickness in advance of the subsequent operation in order to prevent breakage and secure uniformity of the product.

A still further object of the invention is to provide an improved form of drill-chuck and drill-chuck supporting device and to provide for the proper locking of the chucks in proper position under the drills.

With these and other objects in view the invention consists in the novel construction and arrangement of parts hereinafter described, illustrated in the accompanying drawings, and particularly pointed out in the appended claims.

In the drawings, Figure 1 is a front elevation of a button-making machine constructed in accordance with my invention. Fig. 2 is a side elevation of the same. Fig. 3 is an enlarged detail view in section of the mechanism for centering or forming the central recess in the button-blank. Fig. 4 is a front elevation of the holder for the centering-tool. Fig. 5 is a detail view of the mechanism for locking the chuck-carrier in position after each angular movement. Fig. 6 is a detail sectional view of the preliminary grinding wheel or disk for facing the blanks. Fig. 7 is a detail sectional view of the same on the line 7 7 of Fig. 6. Fig. 8 is a detail sectional view of one of the drill-supports. Fig. 9 is a transverse sectional elevation of the same on the line 9 9 of Fig. 8. Fig. 10 is a transverse sectional elevation of a portion of one of the chucks, illustrating a friction locking device for holding the chuck from rotative movement during the drilling operations. Fig. 11 is an elevation of one of the supporting-standards forming a part of the frame. Fig. 12 is a transverse sectional elevation of the same on the line 12 12 of Fig. 11. Fig. 13 is a similar view on the line 13 13 of Fig. 11.

Similar numerals of reference are employed to indicate corresponding parts throughout the several figures of the drawings.

On a suitable base 15 are arranged three standards 16, 17, and 18, forming a frame for the support of the various operating devices. In the lower portion of the frame and partly supported by a small standard 19 is a shaft 20, having a belt-wheel 21, receiving motion from any suitable source of power. This shaft is provided with a pinion 22, intermeshing with a pinion 23, which engages the teeth of a large gear-wheel 24, mounted loosely on a shaft 25, adapted to bearings in the standards 17 and 18. The large gear-wheel 24 intermeshes with a plurality of pinions 26, carried by shafts 27, which serve to move the various tool-slides from and toward the buttons in the manner hereinafter described. Between the two standards 16 and 17 is a stationary spindle 29, on which is mounted a chuck-carrying ring 30, having at one side a gear 31, intermeshing with a mutilated gear 32 on the shaft 20, the mutilated gear serving to impart an intermittent rotative movement to the chuck-carrier during the operation of the machine. The chuck-carrying ring is provided with inner and outer bearings 34 and 35, arranged in radially-alined pairs and serving as supports for chuck-carrying sleeves 36. In the periphery of each sleeve are annular grooves 37 for the reception of antifriction-balls running on the inner faces of the bearings, and each sleeve supporting a longitudinally-adjustable chuck 38, having a tapering and slotted head 39 of the usual construction for the reception of a button-blank. The inner end of the chuck-spindle projects beyond the inner face of the bearing 34, and at its outer end is an enlarged head 40, provided with a central recess for the reception of an antifriction-ball 41, which is confined in place by a metallic ring 42, suitably secured to the head 40. Between the inner face of the bearing 34 and the head 40 is a coiled compression-spring 43, which normally serves to maintain the chuck in blank-engaging position, the chuck being held closed on the blank during the major portion of the revolving movement of the carrier 30 and being released to deposit a finished button by the contact of the antifriction-ball 41 with a cam 44, carried by the standard 16. The spindle is provided with a laterally-projecting pin 45, adapted to enter a slot 46 in the sleeve to compel the rotative movement of both the sleeve and spindle, while permitting independent longitudinal movement of the spindle while the chuck is being moved to button engaging and releasing position.

To the chuck-sleeve is secured a beveled friction-gear 48 and a friction-brake disk 40, the latter being acted upon by a segment 50, pivoted at one end to the chuck-carrier and being provided at a point near the opposite end with a spring 51, which is brought into contact with a fixed segment 52, carried by the standard 17 during all the time the chucks are being moved to position under the several drills.

The beveled disk 48 is employed for the purpose of rotating the chucks when the latter are moved to a position under the centering-tool, as shown in Fig. 3. When the chucks reach this position, the disks 48 are engaged by a friction-disk 52', mounted on a shaft 53 and rotated through the medium of a belt carried by a belt-wheel 54 on said shaft. In order to prevent injurious pressure on the chucks, the end standard 16 is provided with a pin 53', on which is mounted a bevel-disk 54', which comes into contact with each disk 48 at a point diametrically opposite the driving-disk 52, thereby insuring sufficient frictional contact between the two disks to drive the disk 48 and the chuck against the resistance offered by the centering-tool.

The standard 17 is provided with a ring 56, on the periphery of which are secured a number of slotted guiding-blocks 57, 58, 59, 60, 61, and 62, arranged at equidistant intervals and spaced from each other at a distance equal to the spacing of the several chucks held by the carrier 30. In the present instance ten chucks are employed, and the mutilated gear 32 is provided with a sufficient number of teeth to impart a one-tenth revolution to the gear and chuck-carrier at each movement, the chuck-carrier being stopped at regular intervals and the button-blank being operated upon by the several tools supported by the blocks.

The block 57 is provided with dovetail guideways for the reception of a slide 63, carrying two bearings in which is supported a shaft 64, provided at its lower end with a grinding-disk 65, formed of any suitable material. At the upper end of the shaft is a grooved wheel 66, driven by a belt from a revolving pulley 67. The central portion of the slide 63 is recessed for the reception of a cam of the construction best shown in Fig. 8. The shaft 27 is provided with an adjustable collar 68, to which is secured a curved bar 69, forming a cam which is seated in a recess 70 in the slide 63 and imparts reciprocating movement thereto, the grinding-disk 65 being forced into contact with a button-blank carried by one of the chucks. In order to prevent breakage and to insure uniformity in the grinding of the blanks, the shaft or spindle 64 is provided with a helical compression-spring 72, arranged between the upper bearing, and a collar 73, rigidly secured to the shaft, a slight yielding movement of the disk being permitted and irregularity in the thickness of the blanks being thus compensated for. The bar 69, which forms the actuating-cam, is secured to the collar 68 by two or more screws, the screw at the outer end of the cam being adjustable to some extent in order that the curvature of the cam may be regulated to any desired extent. The grinding-disk 65 serves as a facing-tool, and the blanks carried by the several chucks are first subjected to the action of this disk in order that the face of the blanks may be dressed to a uniform degree and the danger of breakage from the contact of the centering-tool with uneven and irregular blanks be reduced to a minimum.

The driving mechanism for the belt-wheel 67 comprises a beveled friction-disk 74, mounted on a suitable shaft adapted to bearings in an auxiliary frame 75, carried by the standard 17, said disk being in contact with a large friction-disk 77, carried by the shaft 25 and rotated by a link belt 78 and similar sprocket-wheels from the lower shaft 20. Each one of each of the tools carried by the machine is operated by the friction-disk 77, the belt connections, disks, and pulleys being substantially the same as that employed for driving the grinding-disk 65, and similar reference-numerals being employed to indicate corresponding portions of the mechanism.

The inner ends of the chucks make contact with one of the cams 44 as they approach the grinding-disk and the operator inserts a blank in each chuck. The intermittent rotative movement of the chuck-carrier brings the chuck and blank to a position under the grinding-disk 65, the chuck being stopped and held until the grinding is accomplished. At the next rotative movement of the chuck-carrier through the action of the mutilated gear 32 the chuck and blank are brought to a position in vertical alinement with the centering-tool, as shown in Fig. 3, this tool being employed for the purpose of forming the central recess or depression usually found in buttons.

The block 58 is provided with a dovetail guideway for the reception of a vertically-disposed slide 80, which is reciprocated by a cam 69, mounted on one of the shafts 27 in the manner previously described. Secured to or formed integral with the front face of the slide is a circular disk 81, provided with a number of recesses or openings 82. The slide is provided with a centrally-disposed stud 83, on which is mounted a tool-carrier 84, having any desired number of grooved tool-carrying arms, six of such arms being employed in the present instance and each arm being provided with a centering-tool 85, which is confined in place by a clamping-plate 86, the latter being held in position by a collar 87, surrounding the arm and carrying a screw 88, which may be forced into contact with the plate in order to hold the latter firmly against the tool. The tools carried by the several arms are all of the same construction and their cutting edges are at equal distances from the center of rotation of the tool-carrier. A single centering-tool could be here employed to effect the desired result; but it is preferred to use a plurality of tools in order that a dulled or worn tool may be quickly replaced without the necessity of stopping the machine, this being a source of considerable loss in the manufacture of buttons from mother-of-pearl, where the tools require frequent sharpening owing to the nature of the material. To provide for the sharpening of the tools without removing the same from the tool-carrier, I employ a grinding-disk 90, carried by a short shaft adapted to bearings in an arm 91, pivoted to a bracket 92, carried by the block 58. The shaft is provided with a grooved pulley 93, driven by a suitable belt or cord from one of the grooved pulleys 67, the belt being guided and held taut by idlers 94, mounted on studs carried by the arm 91. The grinding-disk 90 may be moved into contact with the tools by means of a milled nut 95, mounted on the threaded end of the rod 96, the rod being surrounded by a helical compression-spring 97, which normally tends to elevate the arm and remove the grinding-tool from operative position. In the operation of this portion of the mechanism the several tools are mounted in the arms, and the tool-holder is then rotated until all of the tools have moved into contact with the grinding-disk, and the uniformity of distance of the cutting edges from the center of rotation being thus assured. The tools are held in operative position by means of a pin 99, extending through a guiding-opening in the tool-carrier and adapted to enter any one of the series of openings 82 in the stationary disk 81. The outer end of the pin is pivotally connected to an operating-lever 100, carried by a stud 101, projecting from the central pivot-stud 83. When the tool-holder is to be revolved, the lever is operated to remove the end of the pin from the opening 82, when the tool-holder may be moved to present the next tool to the button, the pin being released and allowed to enter the next locking opening in the disk 81. Owing to the frequent grinding of the tools the distance of the cutting edges from the center of rotation is materially reduced, and as the tool-carrying slide receives at all times the same amount of reciprocatory movement a shortened tool could not act to properly center a button-blank. To compensate for the shortening of the tools, each of the tools may be independently adjusted to project their cutting edges to the desired distance from the center of rotation; but it is preferred to automatically compensate for the wearing away of the tools by providing the tool-carrying slide 80 with a bar 102, which is vertically adjusted each time the tool-holder is completely rotated. The bar 102 is connected to a pair of threaded rods 103, on which are mounted gears 104, said gears being intermeshed with an intermediate pinion 105, with which engages a pawl 106, projecting from the revoluble tool-carrier. Each rotation of the tool-carrier brings the pawl into engagement with the pinion and turns both of the screws to effect a vertical movement of the bar 102 for a distance equal to the amount of material removed from the tools by the grinding-disk. While it is preferred to employ a centering device of the character illustrated and described, it will be understood that any ordinary form of centering-tool may be employed for the purpose without departing from the invention. After the button-blank is properly centered it receives a further movement to properly present the blank to the first of the drills, and any desired number of drills may be employed in accordance with the character of the button to be manufactured. In the drawings I have illustrated the employment of four drills for the manufacture of a four-hole button; but it will be understood that the number of drills may be increased or diminished or a portion of those shown may be temporarily adjusted to inoperative position for the manufacture of a button of different character. Each of the drill-slides is of the character shown in Figs. 8 and 9 and comprises a radially-movable plate 108, carried by the grooved block and having a central recess for the reception of one of the operating-cams 69, carried by a revoluble shaft 27. The slide 108 is pivotally connected by a pin 109 to an auxiliary plate 110, having an arcuate slot 111 arranged in a line concentric with the pivot-pin, the plate and slide being confined together by a threaded bolt and thumb-nut 112, which may be loosened to permit the movement of the plate 110 on its pivot center and the adjustment of the drill to an inoperative position. The plate 110 is provided with bearings for the reception of a drill-spindle 113, having at its inner end a chuck for the reception of a suitable drill and at its outer end a grooved pulley 66, driven by one of the pulleys 67, previously described. All of the drills are arranged in different planes with respect to the axes of the drill-spindles when in a normal position in order to properly form the openings in the button. Where a two-hole button is to be made, the thumb-screw 112 of two of the tool-carrying slides are loosened and the slides adjusted to inoperative position. The adjusting means permits of the ready removal of a tool for grinding and, further, permits of the locking of the slide in any desired position. After the button-carrying chuck leaves the facing-disk it is stopped in the position shown in Fig. 3 at a point under the centering-tool, and at this time the beveled friction-disks 48, 52', and 54' come into contact, the disk 48 being revolved at any desired speed under the relatively stationary centering-tool. After leaving the centering-tool and while traveling to position under the several drills it becomes necessary to prevent rotative movement of the chucks, and this is accomplished by means of the curved friction-brake 50, previously described. The curved bar 52 extends continuously under all of the drills, and as the chucks leave the centering-tool the springs 51 come into contact with the bar 52 and the friction-bars 50 are forced into contact with the disks 49, thus holding the chucks from rotative movement during the drilling of the holes. After the drilling of the last hole the springs 51 leave the curved bar, and thence the chuck-spindles are acted upon by one of the cams 44 to open the chuck and allow the completed button to fall into a suitable receptacle. The chucks are held open or are again opened at the rear side of the machine, the operator placing a single blank beneath one of the chucks and the latter closing on said blanks before the chuck is stopped under the facing-tool or grinder 65. In order to properly lock the chuck-carrier at the completion of each intermittent rotative movement, said chuck-carrier is provided with a number of pins 115, which are successively engaged by a holding-spring 116, projecting from the standard 17, and immediately in advance of the engagement of the mutilated gear 32 with the chuck-carrier a cam 117 on said gear engages the end of the spring and moves the latter from contact with the pin 115, the further movement of the gear effecting the rotative movement of the chuck-carrier.

While the construction herein described, and illustrated in the accompanying drawings, is the preferred form of the device, it is obvious that various changes in the form, proportions, size, and minor details of the structure may be made without departing from the spirit or sacrificing any of the advantages of the invention.

Having thus described my invention, what I claim is—

1. In a button-making machine, a revoluble chuck-carrier, a chuck mounted therein, means for imparting a step-by-step rotative movement to the carrier, a centering-tool, means for revolving the chuck when in alinement with the centering-tool, a plurality of drills, means for locking the chuck from rotative movement when in alinement with the drills and during the movement of the chuck from drill to drill, and means for imparting reciprocatory movement to the centering-tool and the drills.

2. In a button-drilling machine, a grooved block, a slide guided therein, means for reciprocating said slide, a plate fulcrumed to the slide, means for locking the plate and slide to each other, a drill carried by said plate, means for rotating the drill, and a button-carrying chuck movable into alinement with the drill.

3. In a button-drilling machine, a grooved block, a slide guided therein, a plate pivoted to the block and provided with a segmental slot, a locking-screw extending through the slot and into a threaded opening in the slide, a drill carried by the plate, means for revolving the drill, mechanism for imparting reciprocating movement to the slide and drill, a button-carrying chuck, and means for moving the same into alinement with the drill.

4. In a button-drilling machine, a revoluble chuck-carrier, means for imparting a step-by-step rotative movement thereto, a stationary frame, a series of radially-mounted drill-carrying slides supported by the frame, drills carried by the slides, grooved pulleys secured to the drills, radially-disposed spindles supported in bearings on the stationary frame, belt-wheels carried by the spindles, belts connecting the belt-wheels to the pulleys of the drills, friction-disks also secured to said spindles, a revoluble friction-disk in contact with all of the spindle-carried disks, and means for reciprocating the drill-carrying slides.

5. In a button-drilling machine, a revoluble chuck-carrier, means for imparting a step-by-step rotative movement thereto, blank-carrying chucks mounted in the chuck-carrier, radially-disposed drill-supporting slides, cams for actuating said slides, shafts carrying said cams, pinions mounted on the shaft, a continuously-revolved gear-wheel intermeshing with all of the pinions, drills carried by the slides, and means for continuously revolving said drills.

6. In a button-making machine, a chuck for the support of a button-blank, a button-forming tool, a reciprocatory slide carrying said tool, a shaft, a collar secured thereto, and a curved bar adjustably secured to the collar and forming a cam for actuating said slide.

7. In a button-making machine, a revoluble chuck-carrier, means for imparting a step-by-step rotative movement thereto, chucks mounted in the carrier, a friction-disk carried by each chuck, a centering-tool, a friction-disk disposed in alinement with the tool and adapted to engage with the chuck-disk to effect the rotation of the chuck.

8. In a button-making machine, a revoluble chuck-carrier, means for imparting a step-by-step rotative movement thereto, chucks mounted in said carrier, a friction-disk carried by each chuck, a centering-tool, a driving-disk disposed in alinement therewith and adapted to engage with and revolve the chuck-disk, and an idler-disk carried by the supporting-frame of the machine and adapted to engage the chuck-disk at a point diametrically opposite the engagement of the latter with the driving-disk.

9. In a button-making machine, a revoluble chuck-carrier, means for imparting a step-by-step rotative movement thereto, chucks mounted in the carrier, a centering-tool, a plurality of drills, a friction-disk carried by each chuck, means for engaging and rotating said disks when the chucks are in alinement with the centering-tool, and friction-brakes for preventing rotative movement of the chucks during the drilling operations.

10. In a button-making machine, a revoluble chuck-carrier, means for imparting a step-by-step rotative movement thereto, chucks mounted in the carrier, a centering-tool, means for revolving the chucks in alinement with the centering-tool, a friction-wheel carried by each chuck, pivoted friction-blocks supported by the carrier and adapted to engage said friction-wheels, springs carried by said blocks, and a curved trackway adapted to engage the springs and to force the blocks into contact with the friction-wheel.

11. In a button-making machine, a blank-receiving chuck, means for supporting the same, a grinding-disk for facing the blank, a spindle carrying the disk, bearings for said spindle, a collar mounted on the spindle, a spring extending between the collar and one of its spindle-bearings, a slide supporting said bearings, and means for moving the slide toward and from the button-blank.

12. In a button-making machine, a revoluble chuck-carrier, means for imparting an intermittent rotative movement thereto, a plurality of chucks mounted in the carrier, a fixed frame, a plurality of radially-slotted blocks carried thereby, button-forming tools, slides carrying said tools and adapted to the slotted blocks, cams for actuating said slides, shafts carrying said cams, pinions secured to the shafts, a continuously-revolved gear-wheel intermeshing with all of the pinions, a continuously-revolved friction-wheel, and tool-actuating friction-disks supported by the frame and engaging said friction-wheel.

13. In a button-making machine, a revoluble chuck-carrier, a gear carried thereby, a mutilated gear intermeshing with said rack and adapted to impart a step-by-step rotative movement thereto, a plurality of locking-pins projecting from the carrier, a spring-arm carried by the frame of the machine and adapted to be engaged by the pins, a cam carried by the mutilated gear and adapted to move said spring-arm to releasing position, and button-forming tools disposed peripherally of the chuck-carrier.

14. In a button-making machine, a revoluble chuck-carrier having adjustable bearings, a chuck-sleeve adapted to said bearings and provided with a longitudinal slot, a friction-wheel secured to the sleeve, a chuck-spindle, a pin carried by the spindle and extending into the slot in said sleeve, an enlarged head or flange at the inner end of said spindle, a coiled compression-spring extending between the head or flange and the inner end of the sleeve, an antifriction-ball adapted to a recess in said head, an auxiliary ring secured to the head and adapted to retain the antifriction-ball in position, and a cam with which the ball engages during the movement of the carrier to effect the movement of the chuck-spindle to releasing position.

In testimony that I claim the foregoing as my own I have hereto affixed my signature in the presence of two witnesses.

GEORGE W. PELTON.

Witnesses:
D. S. McDermid,
E. W. Smith.